United States Patent [19]

Lapinski et al.

[11] Patent Number: 5,548,107

[45] Date of Patent: * Aug. 20, 1996

[54] SCANNER FOR RECONSTRUCTING OPTICAL CODES FROM A PLURALITY OF CODE FRAGMENTS

[75] Inventors: Charles Lapinski, Bethlehem; Charles Eckert, Telford; Richard Skokowski, Green Lane; James Cox, Quakertown; William Scott, Sellersville; Edward Chaleff, Doylestown; Meghanad D. Wagh, Bethleham, all of Pa.

[73] Assignee: Accu-Sort Systems, Inc., Telford, Pa.

[ * ] Notice: The term of this patent shall not extend beyond the expiration date of Pat. No. 5,028,772.

[21] Appl. No.: 87,597

[22] Filed: Jul. 2, 1993

Related U.S. Application Data

[63] Continuation-in-part of Ser. No. 902,574, Jun. 22, 1992, Pat. No. 5,466,921, which is a continuation of Ser. No. 586,545, Sep. 21, 1990, Pat. No. 5,124,538, which is a continuation-in-part of Ser. No. 237,517, Aug. 26, 1988, Pat. No. 5,028,772.

[51] Int. Cl.$^6$ .................................................. G06K 7/10
[52] U.S. Cl. ............................................ 235/462; 235/467
[58] Field of Search ............................... 235/462, 467

[56] References Cited

U.S. PATENT DOCUMENTS

| | | |
|---|---|---|
| 3,044,696 | 7/1962 | Feissel . |
| 3,206,592 | 9/1965 | Nadler . |
| 3,211,470 | 10/1965 | Wilson . |
| 3,220,301 | 11/1965 | Koonz et al. . |
| 3,227,861 | 1/1966 | Schlieben . |
| 3,257,545 | 6/1966 | Van Berkel et al. . |
| 3,283,303 | 11/1966 | Cerf . |
| 3,373,265 | 3/1968 | Smitzer . |
| 3,378,674 | 4/1968 | Unk et al. . |
| 3,408,483 | 10/1968 | Zuse . |
| 3,409,760 | 11/1968 | Hamisch . |
| 3,461,276 | 8/1969 | Recca . |
| 3,467,819 | 9/1969 | Jorgensen . |
| 3,588,457 | 6/1971 | Bijleveld . |
| 3,639,728 | 2/1972 | Helfand et al. . |
| 3,643,068 | 2/1972 | Mohan et al. . |
| 3,657,522 | 4/1972 | Wildhaber . |
| 3,663,800 | 5/1972 | Myer et al. . |
| 3,671,722 | 6/1972 | Christie . |
| 3,676,646 | 7/1972 | Carlsen et al. . |
| 3,688,955 | 9/1972 | L'Huillier . |
| 3,701,097 | 10/1972 | Wolff ...................................... 235/472 |
| 3,711,683 | 1/1973 | Hamisch, Sr. . |
| 3,717,750 | 2/1973 | Gilberg et al. . |
| 3,728,677 | 4/1973 | Munson . |

(List continued on next page.)

FOREIGN PATENT DOCUMENTS

| | | |
|---|---|---|
| 57-164373 | 10/1982 | Japan . |
| 62-31485 | 2/1987 | Japan . |
| 62-231387 | 10/1987 | Japan . |

OTHER PUBLICATIONS

Letter From Accu–Sort President Al Wurz, Dated Jun. 24, 1986—Enhance Bar Code Scanner (Exhibit "A").
Development Order From U.S. Postal Service To Accu–Sort, Dated Oct. 16, 1986 (Exhibit "B").
Order From U.S. Postal Service To Accu–Sort For Three (3) Scanners (Exhibit"C"), May 12, 1988.
Hildebrand, Reading The Supermarket Code Sep. 1974, pp. 10–18.

*Primary Examiner*—Donald T. Hajec
*Assistant Examiner*—Michael G. Lee
*Attorney, Agent, or Firm*—Volpe and Koenig, P.C.

[57] ABSTRACT

A scanner which can read machine-readable code on an object. A scanner has a scanning device, a data device and a reconstruction device. The scanning device can repetively scan the code and provide a scan signal repetively corresponding to at least fragments of the code. The data device is coupled to the scanning device and responds to its scan signal for repetively storing it. The reconstruction device is coupled to the data device for reconstructing the code from at least two of the fragments of the code.

8 Claims, 9 Drawing Sheets

U.S. PATENT DOCUMENTS

| | | | |
|---|---|---|---|
| 3,735,096 | 5/1973 | Knockeart et al. . | |
| 3,761,685 | 9/1973 | Alpert et al. . | |
| 3,770,940 | 11/1973 | Harr . | |
| 3,770,942 | 11/1973 | McMurtry . | |
| 3,774,014 | 11/1973 | Berler . | |
| 3,786,237 | 1/1974 | Postal . | |
| 3,789,193 | 1/1974 | Bremner . | |
| 3,796,863 | 3/1974 | Nickl et al. . | |
| 3,800,282 | 3/1974 | Acker . | |
| 3,801,775 | 4/1974 | Acker . | |
| 3,808,405 | 4/1974 | Johnson et al. . | |
| 3,809,863 | 5/1974 | Oberg . | |
| 3,812,325 | 5/1974 | Schmidt . | |
| 3,813,140 | 5/1974 | Knockeart . | |
| 3,818,191 | 6/1974 | Fennema et al. . | |
| 3,838,251 | 9/1974 | Herrin . | |
| 3,845,279 | 10/1974 | Rosdorff . | |
| 3,860,790 | 1/1975 | Reckdahl . | |
| 3,860,793 | 1/1975 | Roe et al. . | |
| 3,860,794 | 1/1975 | Knockeart et al. . | |
| 3,862,400 | 1/1975 | Thomson . | |
| 3,887,793 | 6/1975 | Goodfinger et al. . | |
| 3,891,831 | 6/1975 | Coles, Jr. | 235/463 |
| 3,896,295 | 7/1975 | La Plante . | |
| 3,899,687 | 8/1975 | Jones . | |
| 3,902,047 | 8/1975 | Tyler et al. . | |
| 3,906,203 | 9/1975 | Butulis . | |
| 3,909,787 | 9/1975 | Laurer et al. . | |
| 3,916,158 | 10/1975 | Sansone et al. | 235/467 |
| 3,916,160 | 10/1975 | Russo et al. . | |
| 3,961,164 | 6/1976 | Reed et al. . | |
| 3,979,577 | 9/1976 | Seligman | 235/463 |
| 3,988,573 | 10/1976 | Hayosh et al. | 235/467 |
| 3,995,166 | 11/1976 | Hobart et al. | 250/566 |
| 4,013,893 | 3/1977 | Hertig . | |
| 4,020,357 | 4/1977 | Punis . | |
| 4,053,845 | 10/1977 | Gould . | |
| 4,056,710 | 11/1977 | Shepardson et al. | 235/437 |
| 4,059,224 | 11/1977 | Seligman . | |
| 4,064,390 | 12/1977 | Hildebrand et al. . | |
| 4,093,865 | 6/1978 | Nickl | 250/566 |
| 4,097,729 | 6/1978 | Seligman et al. | 235/467 |
| 4,109,143 | 8/1978 | Yamaguchi et al. . | |
| 4,161,436 | 7/1979 | Gould . | |
| 4,289,957 | 9/1981 | Neyroud et al. | 235/462 |
| 4,308,455 | 12/1981 | Bullis et al. | 235/463 |
| 4,329,574 | 5/1982 | Jordan, Jr. . | |
| 4,343,969 | 8/1982 | Kellett . | |
| 4,409,469 | 10/1983 | Yasuda et al. | 235/463 |
| 4,421,978 | 12/1983 | Laurer et al. | 235/462 |
| 4,488,678 | 12/1984 | Hara et al. . | |
| 4,713,532 | 12/1987 | Knowles | 235/467 |
| 4,717,818 | 1/1988 | Broockman et al. | 235/462 |
| 4,745,484 | 5/1988 | Drexler et al. . | |
| 4,816,661 | 3/1989 | Kirchever et al. | 235/472 |
| 4,873,426 | 10/1989 | Sarna et al. | 235/463 |
| 4,967,074 | 10/1990 | Von Stein | 235/467 |
| 4,973,829 | 11/1990 | Ishida et al. | 235/462 |
| 4,988,852 | 1/1991 | Krishnan | 235/462 |
| 5,045,677 | 9/1991 | Okamura | 235/462 |
| 5,059,779 | 10/1991 | Kirchever et al. | 235/467 |

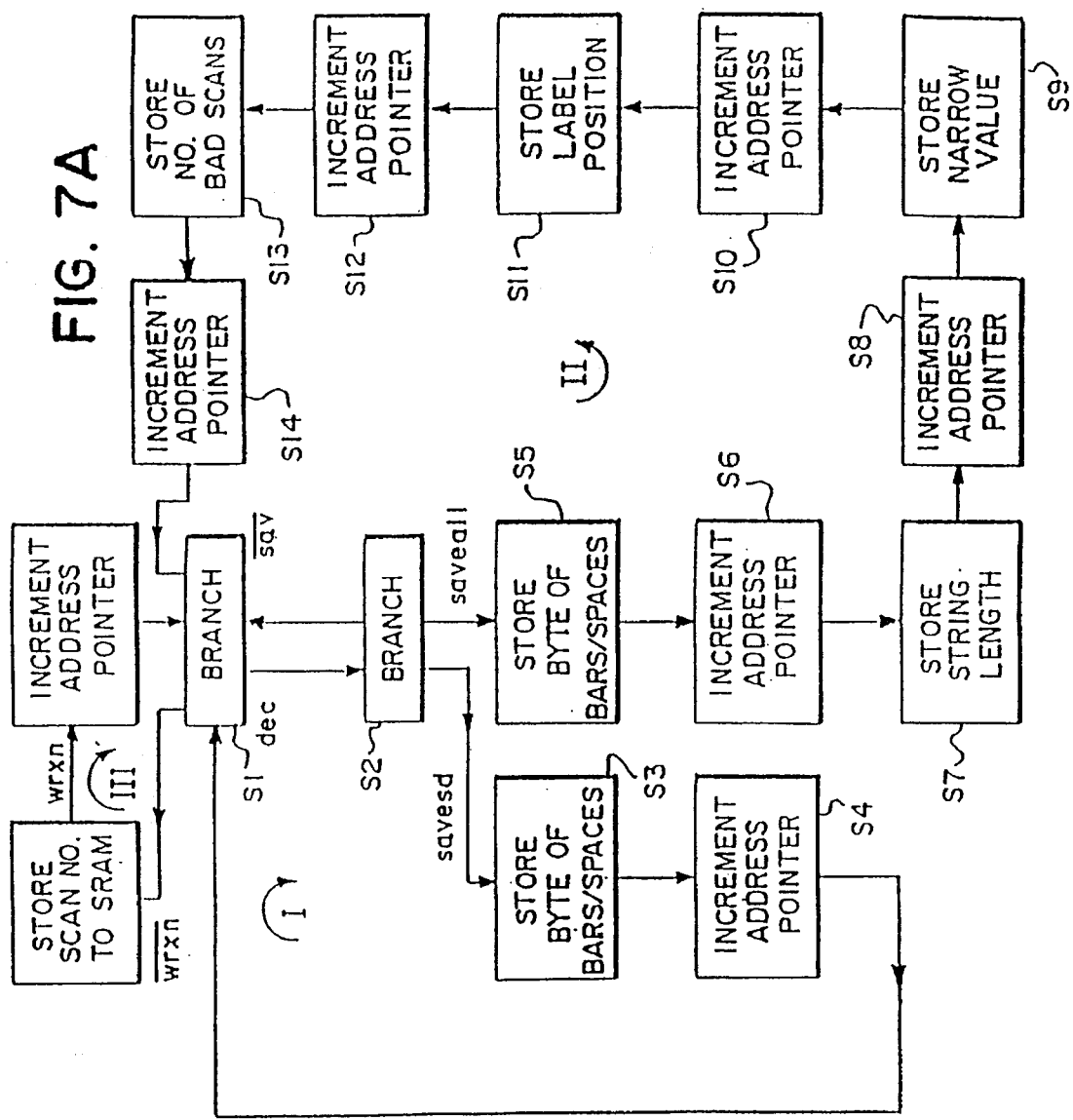

SCANNER FOR RECONSTRUCTING OPTICAL CODES FROM A PLURALITY OF CODE FRAGMENTS

RELATED APPLICATIONS

This invention is a continuation-in-part of application Ser. No. 07/902,574, filed Jun. 22, 1992, now U.S. Pat. No. 5,466,921, which is a continuation of application Ser. No. 07/586,545, filed on Sep. 21, 1990, now U.S. Pat. No. 5,124,538, which is a continuation-in-part of application Ser. No. 07/237,517, filed on Aug. 26, 1988, U.S. Pat. No. 5,028,772.

BACKGROUND OF THE INVENTION

The present invention relates to code scanning devices and, in particular, to apparatus and methods for restoring a code from differing code fragments.

Well known equipment exists for reading a bar code that is printed on a package. Bar codes on merchandise may be scanned at the point of sale to identify the goods and correlate them to a price. Such equipment is commonly used at supermarket checkout counters.

A basic principle conventionally applied in bar code scanning is that of detecting reflected light contrasts. A source of illumination such as a low powered helium neon laser, can produce a beam which is moved across the bar code. Dark areas (bars) absorb laser light, whereas light areas (spaces) reflect light that is subsequently detected by the scanner.

Optics are used to "move" a laser beam. Without these optics, the laser beam appears as a dot. When the optics are used, the beam appears as a line of laser light. This is defined as moving-beam scanning. As the moving beam "travels" across the conveyor (or area to be scanned for a code, commonly called the scanning zone) any light or dark transitions are detected and converted to a digital signal known as code. A valid bar code consists of a defined number of light and dark transitions with correct ratios between the wide and narrow intervals.

Existing codes consist of a series of parallel bars separated by spaces. The bars and spaces are printed at either a full width or half width. The bars and spaces may signify a bit pattern wherein wide spaces or bars are denominated a "one" while narrow spaces and bars are denominated a "zero" (or vice versa).

A basic objective in known bar code scanning is laying down a trace that is dense and varied enough to ensure that at least one scan will recover a complete bar code. The denser the scanning, the more rapidly scanning must occur and, therefore, a higher demand is placed upon the circuitry processing the scanned data.

Known equipment (for example, U.S. Pat. No. 3,728,677) employs a mirrored wheel having a polygonal periphery. Rotation of the mirrored wheel scans a laser beam across two azimuthally spaced mirrors which deflect the beam downwardly to trace an "X" shaped pattern.

Other known equipment has used prisms, mirrors, vidicons, or other apparatus to turn the scan direction of an optical code scanning system. See, for example, U.S. Pat. Nos. 3,663,800; 3,774,014; 3,800,282; 3,902,047; and 4,064,390).

It is also known (U.S. Pat. No. 3,906,203) to scan a bar code and measure its interval widths by recording the time required to traverse each interval. The successive interval widths are multiplied by three, five, and eight. By storing and comparing the multiplied widths of successive scans, the equipment can determine whether the latest interval is about the same size as, or much smaller or larger than, the prior interval. This equipment, however, performs a relatively coarse comparison and will accept as valid, scan times that are excessively short or long.

Accordingly there is a need for a code scanner that does not require support from extraordinarily high speed circuitry, but yet has a high probability of obtaining a complete code when an object passes by the scanner.

SUMMARY OF THE INVENTION

In accordance with the principles of the present invention, a scanner is provided for reading machine-readable code on an object. The scanner includes a scanning means, a data means, and a reconstruction means. The scanning means repetitively scans the code and provides a plurality of scan signals each including a code fragment and an associated code position value that corresponds to one of the successive scans of the code. The data means receives and stores the scan signals. The reconstruction means is coupled to the data means for reconstructing at least a portion of the code from two or more code fragments by determining whether the code position value from a later scan corresponds the code position value from an earlier scan, identifying a subinterval in the later and earlier code fragments, overlaying the code fragments and verifying that the subintervals are in registration. The reconstruction means can include means to shift the code fragments relative to each other when the subintervals are not initially verified in registration.

By employing an apparatus of the foregoing type, an improved scanner is provided. In a preferred embodiment, the scanner can begin operation when an object passes a checkpoint. Preferably, an optical scanner measures the distance between transitions from light to dark and dark to light. These distances between transitions are assigned numeric values based upon a timing process. A preferred "digital filter" compares the numeric values of successive interval widths. Depending upon the pattern of the intervals widths, a pattern detecting process determines whether the measured widths are to be considered wide or narrow. For example, a ratio test may be used to determine if the widths are part of a pattern that may be a segment of a bar code.

All segments of "n" transitions (a value that can be set by software) or more that pass this ratio test are stored as a pattern of wide and narrow values for a subsequent reconstruction process. Patterns of less than five transitions are rejected. If no pattern has a code that is sufficiently long to be considered valid, the preferred apparatus attempts to reconstruct code fragments into a complete bar code pattern. The fragments are compared to each other in consecutive order. The fragments are overlaid, shifting each subsequent segment until the wide and narrow patterns of the segments match or register. When a complete bar code pattern has been reconstructed from two or more fragments, a microprocessor can decode the reconstructed bar code and verify that its checksum is valid.

In a preferred embodiment, the code is scanned optically by a pattern of staggered "X" shaped traces. The staggered scans may be centered at the vertices of a triangle. By using three "X" shaped patterns a pattern of modest complexity is used, which has a high probability of obtaining a full bar code. But if only a fragment of a bar code need be obtained, the probability is nonetheless high that subsequent fragments will be able to reconstruct the full bar code.

BRIEF DESCRIPTION OF THE PREFERRED EMBODIMENTS

The above brief description as well as other objects, features and advantages of the present invention will be more fully appreciated by reference to the following detailed description of presently preferred but nonetheless illustrative embodiments in accordance with the present invention, with reference being made to the following figures in which:

FIG. 7A is a flow chart showing in a general way the sequence of operations of the state means of FIG. 3;

DETAILED DESCRIPTION OF THE PREFERRED EMBODIMENTS

Figure 1:
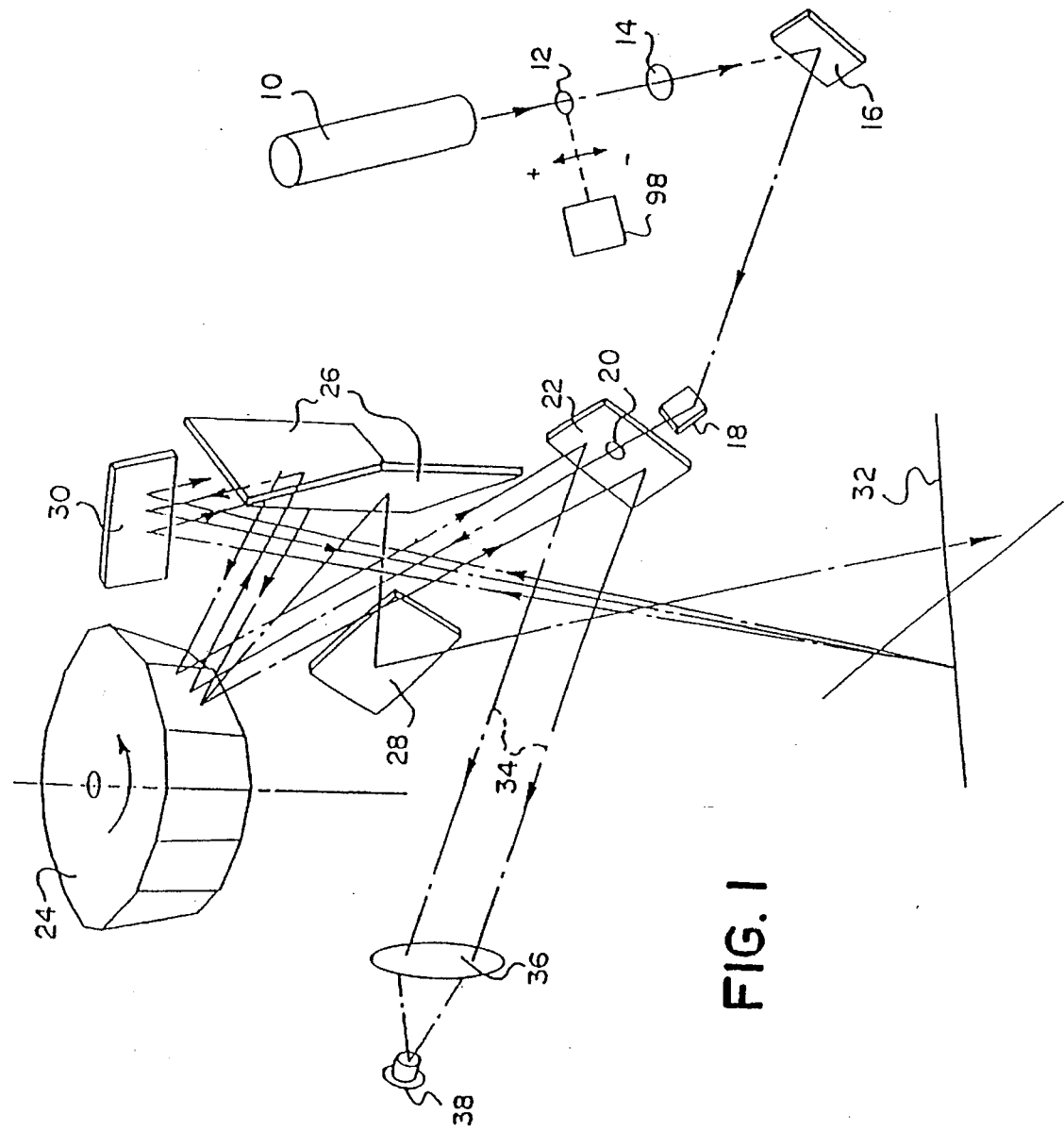
FIG. 1 is a schematic perspective diagram of a scanning means that may be used in an embodiment of the present invention.

Referring to FIG. 1, it illustrates a scanning means employing a source 10 in the form of a laser beam producing through lenses 12 and 14, a narrowly focused coherent beam of light. Lens 12 can be axially shifted by a galvanometer 98 which is part of a dynamic focussing system, described in further detail hereinafter. Briefly however, larger objects scanned by this system appear closer to the scanner while smaller objects appear further away. By dynamically discussing with lens 12, relatively fine bar codes can be clearly examined by the scanner. For example, for code resolution of 0.01 inch, object size is measured by quantizing its size into three inch zones. For each zone transition, lens 12 is axially adjusted 0.001 inch. Of course the specific dimensions applicable in other embodiments will depend upon the specific of the optics employed.

The beam is reflected by mirrors 16 and 18 and passes through aperture 20 in bean splitting mirror 22. The beam is thus directed to the periphery of a deflecting means, shown herein as a rotating mirrored wheel 24. Wheel 24 has twelve, peripheral, mirrored facets, each acting as a rotating mirror. Wheel 24 is driven by a motor (not shown) that determines the scan speed of the laser beam.

After reflecting from wheel 24 (and depending on the angle of the reflected beam), the beam is then reflected from one of the faces of a pair of non-coplanar mirrors, shown herein as first and second contiguous mirrors 26. These mirrors 26 are in the shape of a folded mirror having an obtuse angle facing wheel 24. Accordingly, a beam deflected by wheel 24 can traverse the peak of mirrors 26 and be reflected right or left to intercept either mirror 28 or 30, respectively. Depending upon which path is taken by the laser beam, one or the other branches of "X" pattern 32 is produced. As illustrated by returning rays 34, light may return along the original path of the outgoing laser beam and be reflected again onto mirror 30 (or mirror 28). Thereafter the returning laser light is reflected by mirrors 26, 24, and the reflecting side of beam-splitting mirror 22, before reaching a collector lens 36. The light thus collected is focused by lens 36 onto sensor 38 to measure whether a dark or light interval is being scanned.

The foregoing describes the path of one scan of half of an "X" shaped pattern. The same principles apply to the functioning of the other half of the pattern. In operation, the mirrors are used to split the single scan line into two parts. As the mirror wheel 24 rotates at high speed, beam handling mirrors 26, 28 and 30 cause two lines of the "X" pattern to alternate rapidly. For example: five facets of the mirror wheel at a slow speed would appear as "VVV". When projected at high speed, the "X" pattern becomes visible.

The scan head of FIG. 1 will be supplemented with additional mirror systems to produces three "X" patterns and each will have separate processing electronics of the type described hereinafter. Accordingly, only one "X" pattern need be processed by one circuit. In this preferred embodiment, mirrors 20, 26, 28 and 30 are twice replicated, so that three mirror systems are placed at positions spaced 90 degrees apart. By using three lasers, three separate "X" shaped scans can be produced.

Figure 2A:
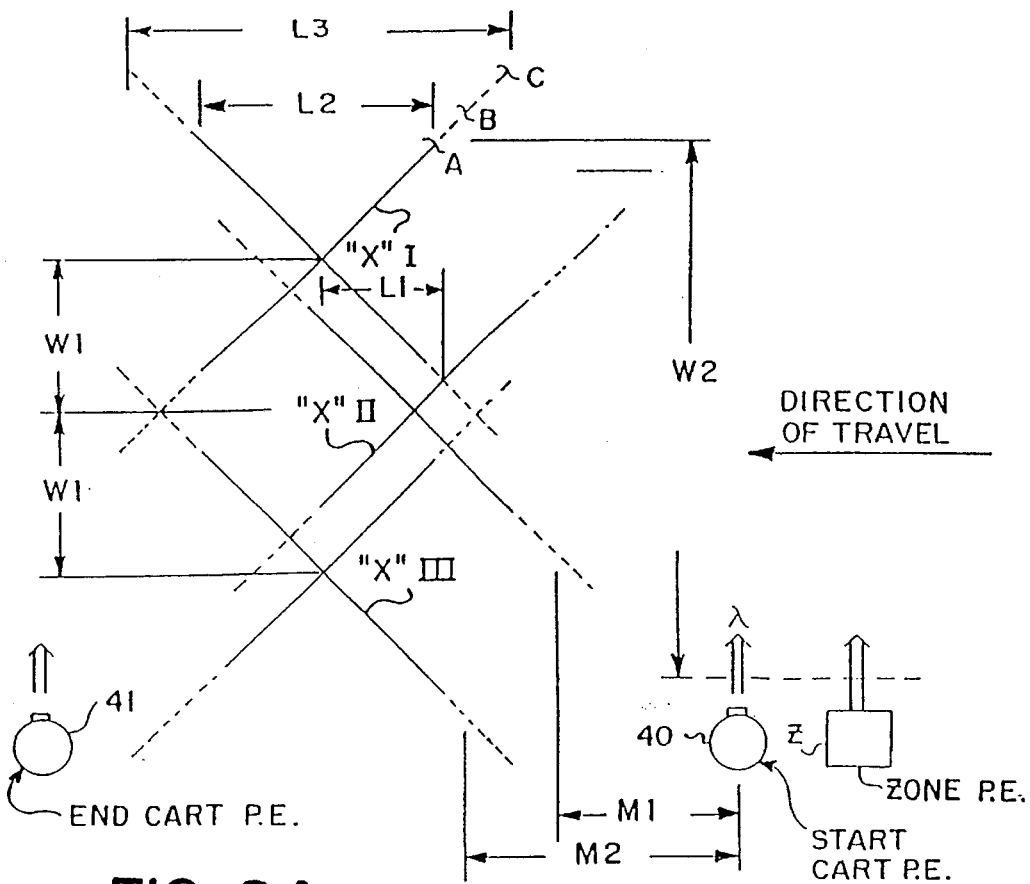
FIG. 2A is a plan diagram of the scans produced by the apparatus of FIG. 1.
Figure 2B:
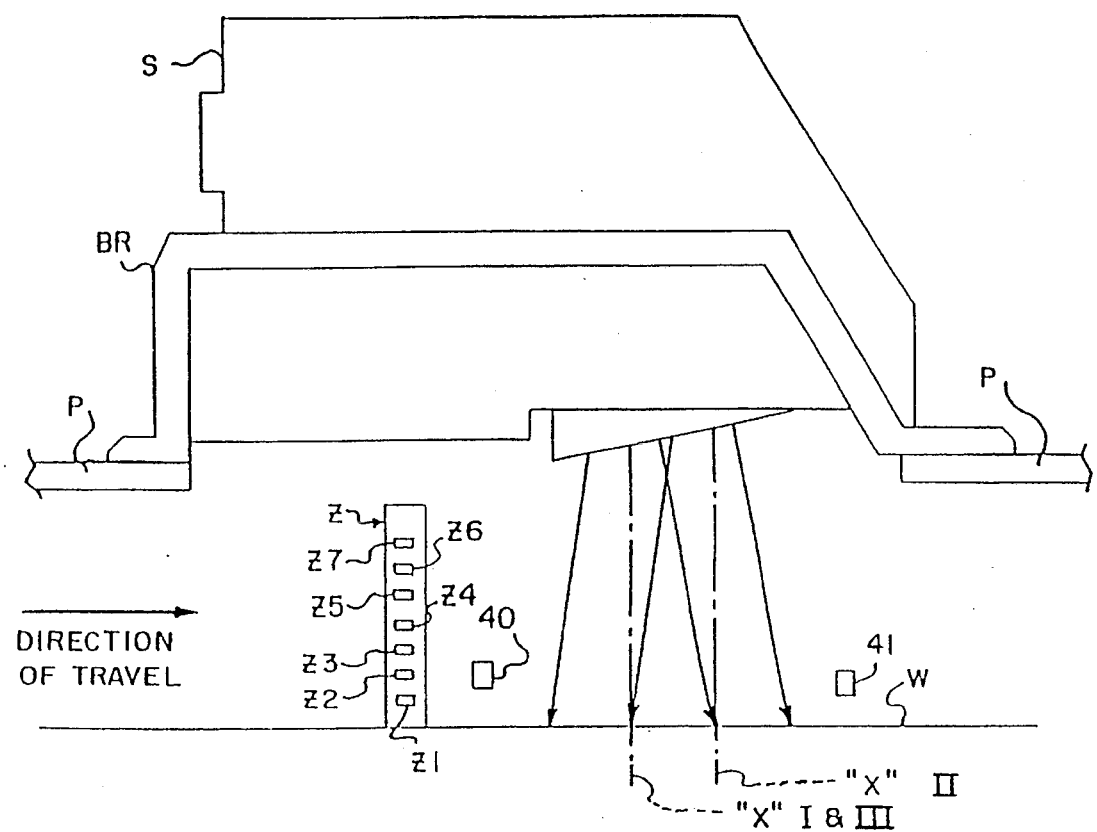
FIG. 2B is an elevation view of a scanner employing the scanning means of FIG. 1.

FIGS. 2A and 2B show three scans "X"I, "X"II, and "X"III produced by three optical systems each as shown in FIG. 1. In a preferred embodiment, the line of an "X" shaped pattern has a length terminating at A and B, for the usable length (80% efficiency) and effective line length, respectively. These two lengths are for objects placed at 28 inches from the scanner. The terminus C represents the total physical line length for an object placed at 42 inches form the scanner of FIG. 1. The spacing L1 in the direction of travel, between scan "X"I and "X"II, is 2 ¾" in the preferred embodiment. The effective length L2 of scan line A along the direction of travel is preferably 6⅔". The length L3 in the direction of travel is about 16". In this embodiment, the pattern to pattern spacing W1 between "X" patterns in a direction perpendicular to the direction of travel is 4⅔". Preferably, the usable width W2 along a conveyor would be 16".

The cart signal is derived from start and end cart photoeyes 40, 41. In this embodiment, cart photoeyes 40, 41 cover an optical path which when interrupted by an object moving in the direction of travel, produces a signal indicating the need to commence scanning. The spacing of photoeye 40 from endpoints B of patterns "X"II and "X"III (spacings M1 and M2) are set to ensure complete scanning of the coded object. It will be appreciated, however, that all of these dimensions can change depending upon the size of the code and the relative uncertainty of the placement or distance of the object or the code on the object to be scanned.

A typical scanning system will employ a mirror wheel with the mirrors on two adjacent sides used to produce the other two "X" patterns in FIG. 2. By using two "X" scanners, a conveyor can be covered with six "X" patterns, and a scanning zone is created to ensure that bar codes located on products travelling the conveyor will be intercepted by one or more of the scanning lines.

As shown in FIG. 2B, the scanner can be contained in housing S and supported by bracket BR mounted on platform P and working surface W. For a large spacing between platform P and work surface W, there is a large depth of field required for laser focussing. Accordingly, the height of an object is determined by the zone detector Z. Relatively small objects will not intercept any of the beams associated with photoeyes Z1–Z7. The next larger class of objects will intercept the beam associated with photoeye Z1. Successively larger objects will intercept the beams of the other photoeyes, the largest object intercepting all photoeyes. Zone detector Z produces in response a digital signal indicating the number of zones intercepted. The zone to zone spacing depends on the fineness of the bar codes being examined. For example, an interleaved 2 of 5 bar code with 0.01 inch minimum bar would require the photoeyes to be placed three inches apart form each other. If the code had a minimum bar size of 0.02 inch, the photoeyes would be placed five inches apart.

Figure 3:
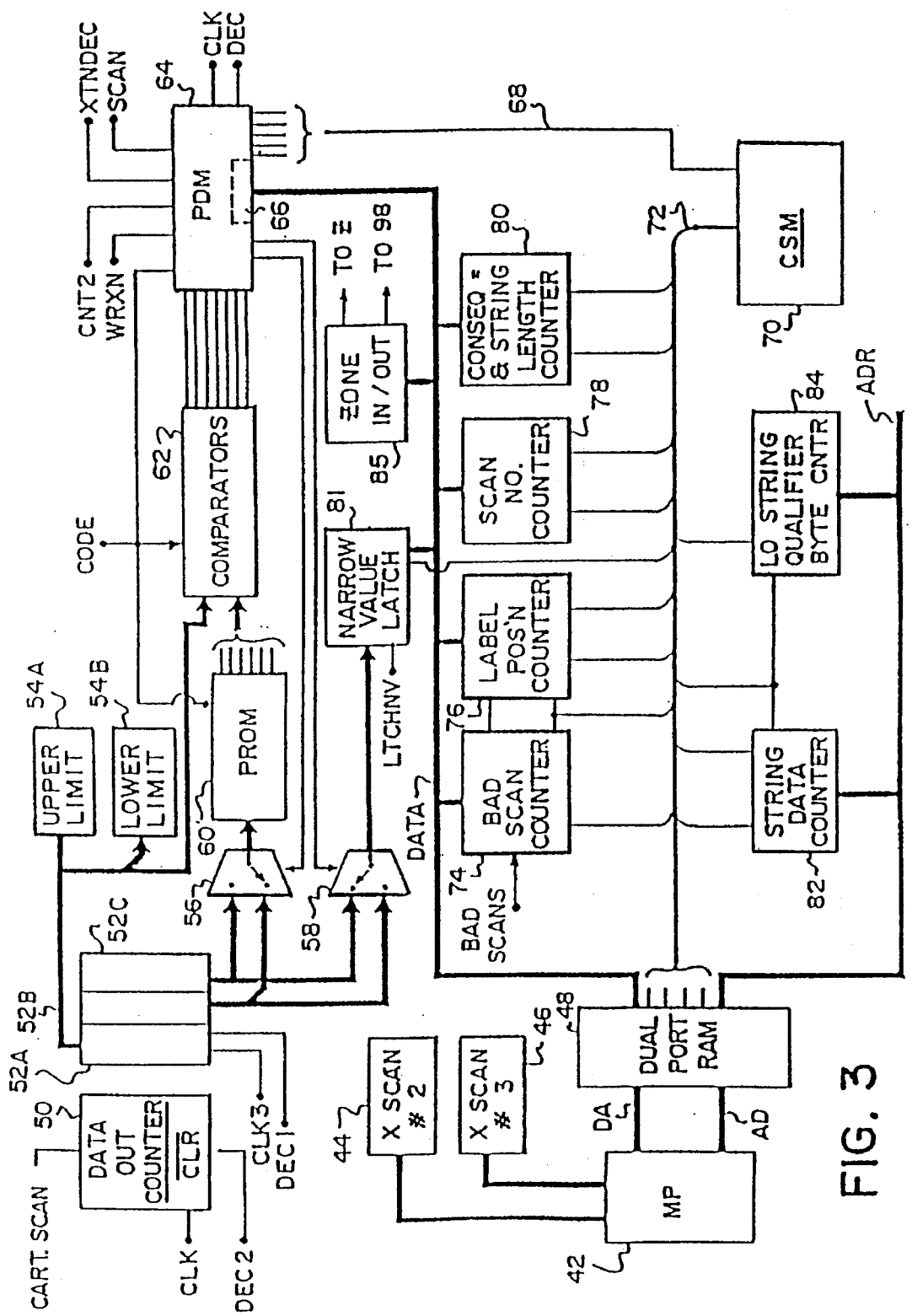
FIG. 3 is a schematic block diagram of the data means and registration means that may be used in an embodiment of the present invention.

Referring to FIG. 3, a registration means is shown herein as microprocessor board 42 which, in this embodiment, employs a microprocessor chip such as a type 80286 manufactured by Intel. Microprocessor board 42 is shown coupled to three data means: data means 44 and 46, the third data means being more elaborated illustrated. The third data means is the balance of the system, excluding blocks 42, 44 and 46. In this embodiment, microprocessor board 42 has its own internal memory. In addition, each data means includes a common memory means shown herein as dual port, random access memory 48. Memory 48 has one port constituting data bus DA and address bus AD, both buses coupled between microprocessor board 42 and common memory 48. The other port comprises data bus DATA and address bus ADR. The dual port memory can be a high speed RAM (SRAM) having one kbyte (type IDT7130).

It will be noted that the buses DATA and ADR allow the automatic updating of code data and string qualifier data into RAM 48 without the intervention of microprocessor board 42. This frees microprocessor board 42 and allows for a very high speed update of code data without being limited by the speed of board 42.

A counter 50 is shown connected to clock input CLK to count it. Counter 50 has a capacity and speed determined by the desired resolution and scan speed. As further described hereinafter, counter 50 is enabled by terminal CART*SCAN during a scan, after an object is detected by the cart photoeyes (elements 40, 41 of FIG. 2A). The count is determined just before the counter is cleared by the transition signal on terminal DEC2. The count accumulated in counter 50 is loaded into the first register 52A, an eight bit data latch, by the transition signal on terminal DEC1 in synchronism with the clock input on terminal CLK3. Register 52A is cascaded with registers 52A and 52B which are interconnected to shift data from register 52A downstream, that is, to registers 52B and 52C.

The data loaded into register 52A are compared to an upper and lower limit through limit devices 54A and 54B, respectively, to signal an out-of-range condition. Second and third registers 52B and 52C each have their outputs connected to separate inputs of multiplexers 56 and 58. The output of multiplexer 56 is applied to the data input of a quantizing means which is shown herein as a programmable read only memory 60, organized to act as a lookup means. Memory 60 is actually composed of six sections. Each section responds to the common data input to produce a signal which signifies a tolerance limit. The limits are three pairs each centered about a nominal value with a predetermined tolerance off that nominal value. The three nominal values are the input value multiplied by one, one-half or two. As explained in further detail hereinafter, these tolerances around the nominal values, allow comparison of successive latched values to determine whether successive scanned intervals are the same, greater or less than the preceding interval of the code.

The three pairs of data limits of the lookup means 60 are applied to separate inputs of a comparator means 62. Comparator means 62 has six digital comparators that compare the output of first register 52A against each of the six limit values from memory 60. Accordingly, the recent output of first register 52A can be bracketed (or found not to be bracketable) within limits established by memory 60 as a function of the earlier values (stored in either second register 52B or third register 52C). The bracketed values are indicated by the six output lines of comparators 62.

The outputs of comparators 62 are applied to a pattern means shown herein as pattern detecting machine 64. In a preferred embodiment, pattern detecting machine 64 includes a XILINX logic configurable array type XC2064. This array is a 68 pin CMOS programmable gate array. Such an array allows implementation of a substantial amount of logic in one integrated package. This high speed circuit is able to detect bar widths as small as four hundred nanoseconds.

As described in further detail hereinafter, pattern means 64 is a nine state machine whose state is determined, in part, by the inputs from comparators 62. The other terminals of pattern means 64, CODE, WRXN, CNTZ, XTNDEC, SCAN, CLK and DEC, correspond to: the state of the optical scan (light or dark), the end of a scan, a clocking event, an extended pulse synchronous with a code transition, the start of a scan, the clock pulse and a non-extended code transition signal, respectively. Pattern machine 64 provides a pair of outputs to control the state of multiplexers 56 and 58. The control signal of multiplexer 56 is also connected to one input of memory 60.

An important feature of pattern means 64 is the register means 66. In operation, the logic array of pattern means 64 can set certain data bits. As explained hereinafter, the successive bits detected in a scanned bar code are stored by the pattern means in register means 66 before being transmitted to dual port memory 48.

Pattern means 64 produces outputs on five control lines 68 to a state means 70 having a logic array similar to that of pattern means 64. In addition, in this embodiment, state machine 70 (operating as a control signal state machine) employs three programmable logic arrays (PALS) to enable the various other devices illustrated herein. Control is effected over control lines 72. The three PLD's in state machine 70 include one type PAL16R6 and two type PAL16L8 devices. The type PAL16R6 device is an array with registered outputs that is used to generate twenty-three different states that are synchronous with the system clocks. These states are coded by five binary bits that are the outputs to the combinational logic. Two type PAL16L8 devices are used here to implement the combinational logic based strictly on the state that the state machine 70 is in.

The outputs are a function of only the current state. Thus, this design may be deemed a Moore machine; that is, the outputs are dependent on the previous input history as held in this state, but are not directly affected by input values. For this reason, a totally synchronous control circuit is used to insure freedom from timing problems.

Control lines 72 include four inputs to dual port RAM 48. Enabling signals are also provided along lines 72 to empty means 74. Means 74 includes a counter and latch so that the total number of bad scans as read on terminal BAD SCANS can be written onto data line DATA.

A position means is shown herein as label position counter 76, a latched counter enabled by control lines 72. An input is provided from state machine 70 along line 72 digitally signifying the position where the valid scanned code ends. The count stored on counter 76 can be written onto bus DATA.

A scan means, shown herein as scan number counter 78 is incremented at the start of each scan and enabled by line 72 from state machine 70. Means 78 is latched so its count can be written onto data bus DATA.

The length of the string stored in register means 66 is loaded by state machine 70 into string length counter 80. Counter 80 also provides the facility for counting the consecutive number of transitions where the ratio of interval widths is one. Counter 80 also has a data output to data bus DATA.

A narrow means is shown herein as latch 81, which stores the data outputs form multiplexer 58. As will be explained hereinafter, the value stored is a value corresponding to the width of a narrow interval as measure by a counter 50. The output of narrow means 86 is coupled to data line DATA.

An address means is shown is shown herein as string data counter 82 and low string qualifier counter 84. The outputs of counters 82 and 84 are connected to address bus ADR to indicate a location in dual port RAM 48 where data is to be stored. String data counter 82 is used to point to a location for storing the code bits of register means 66. Counter 84 is used to point to a location in RAM 48 for storing the counts of counters 74, 76, 78 and 80.

A focussing means is shown herein as latches 85 coupled to zone detector Z (FIG. 2B) and galvanometric focussing device 98 (FIG. 1). When interrogated by microprocessor 42, means 85 transmits a signal corresponding to the highest zone number intercepted by the object carrying the bar code. When a focusing number is transmitted by microprocessor 42, a latch (not shown) in means 85 is set. This setting is converted by a digital to analog converter (not shown) to an analog signal that drives the galvanometer in focusing means 98 (FIG. 1). Accordingly focussing of the laser is accomplished under processor control.

Figure 5:
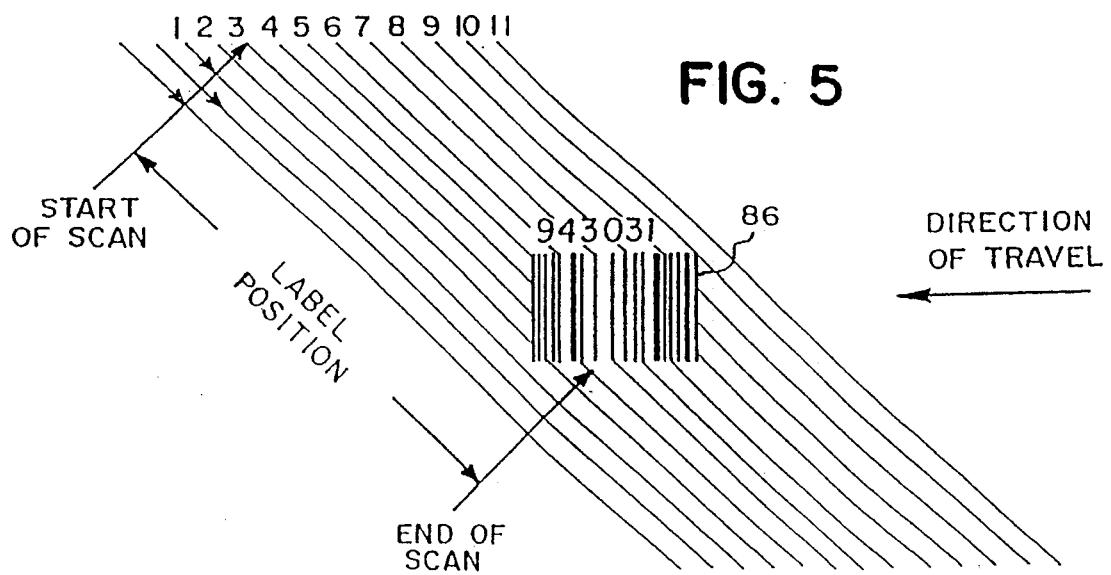
FIG. 5 is a plan diagram showing successive scans across a bar code.

To facilitate an understanding of the principles associated with the foregoing apparatus, its operation will now be briefly described. With laser 10 (FIG. 1) illuminating mirror wheel 24, the "X" pattern 32 is traced. Reflected light and dark bars of a code that fall within "X" pattern 32 are reflected back to photo detector 38. As shown in FIG. 5, successive scans from one branch of "X" pattern 32 can traverse bar code 86 to produce a code signal.

Figure 4A:
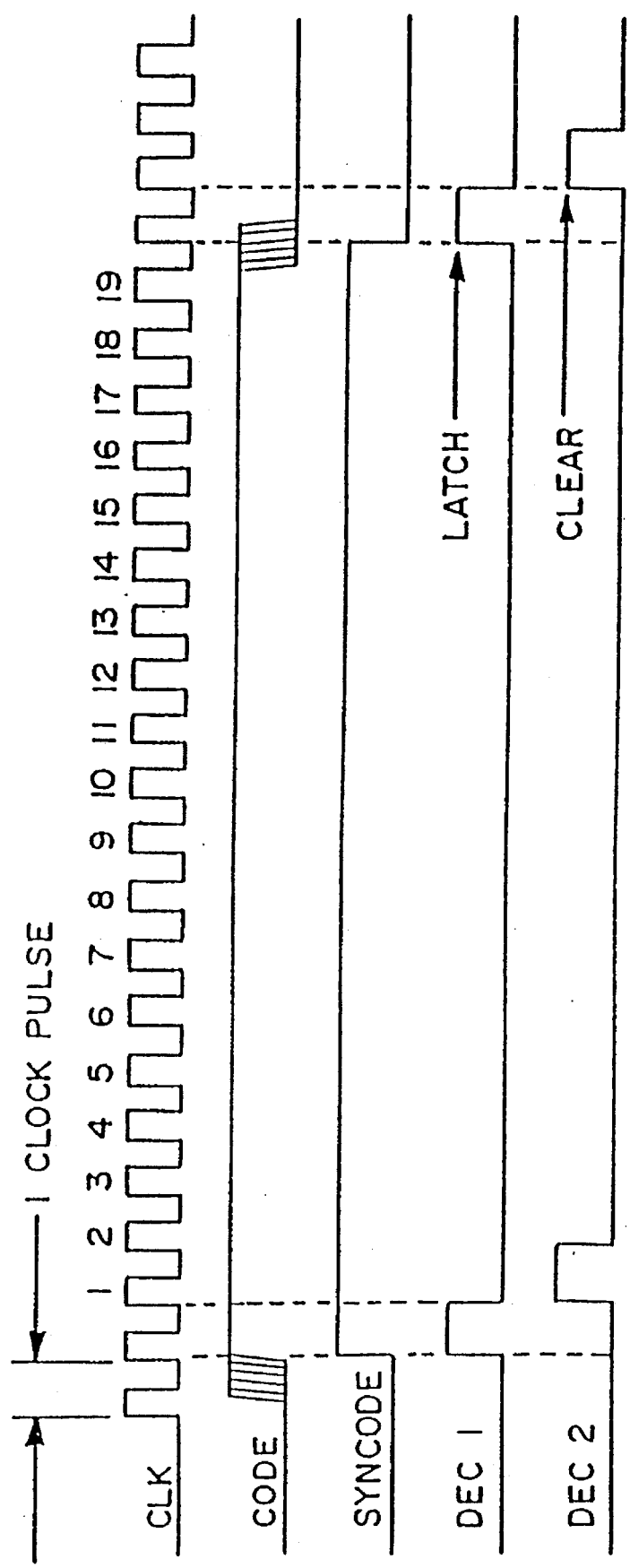
FIGS. 4A and 4B are timing diagrams illustrating signals associated with the apparatus of FIG. 3.

Referring to FIG. 4A, the previously mentioned clock signal CLK is shown as a number of high frequency square pulses. The response of photo detector 38 in the scanner of FIG. 1 is indicated as the output CODE in FIG. 4A. A D-type flip flop (not shown) is triggered by the clock input CLK to hold the data indicated by signal CODE. A synchronous code signal is indicated as signal SYNCODE in FIG. 4A. The signal SYNCODE is combined with the clock signal CLK to produce a single pulse DEC1 which begins at the rising edge of signal SYNCODE and ends one clock pulse period later. A following pulse in signal DEC1 is produced in a similar fashion following the falling edge of signal SYNCODE. Transition signal DEC2 is a pulse delayed by one clock pulse period from signal DEC1. The relationship between signal CODE and transition signals DEC1 and DEC2 are shown on a larger time scale in FIG. 4B.

Referring to FIG. 3, a code transition causes terminal DEC1 to latch the current count of counter 50 into register 52A. One clock pulse period later, the pulse on terminal DEC2 clears counter 50. Thus, at each code transition a new count is stored and then cleared so that a subsequent interval can be measured. It will be noted that any values stored in registers 52A and 52B are first transferred to registers 52B and 52C, respectively. Therefore between successive transitions, counter 50 counts the width of the interval detected by the scanner of FIG. 1. After each transition, the counts then ripple through registers 52A, B and C. Thus, registers 52A, B and C can be considered snapshots of the last three interval widths as determined by the scanner of FIG. 1.

Once register 52B has been loaded, a comparison can take place. Initially, register 52B is connected through multiplexer 56 to memory 60 to generate six outputs: the input multiplied by ½−20%, ½+20%, 1−20%, 1+20%, 2−20%, 2+20% (0.4, 0.6, 0.8, 1.2, 1.6 and 2.4). These values are used to determine if the previous count in counter 52B is about half, equal or double the currently latched count in register 52A. Thus, the memory 60 is used to set a 20% window or tolerance around each value.

Figure 4B:
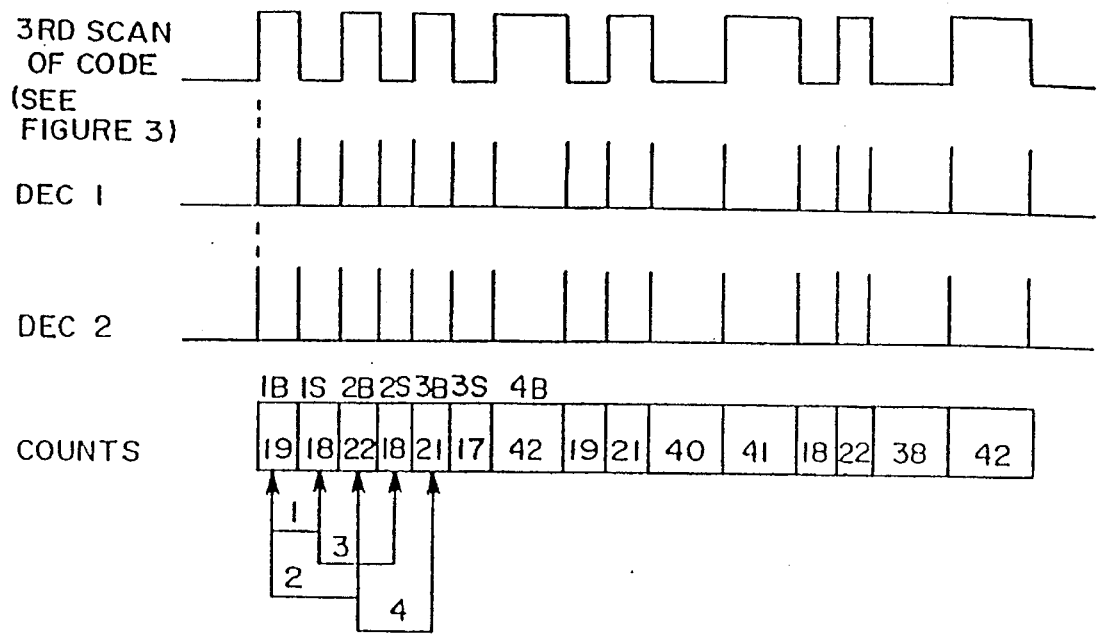

The bottom line (Counts) of FIG. 4B, and Table 1 illustrate how the counter values latched into registers B2A, B and C are stepped through the registers so that bars can be compared to bars and spaces to spaces. Using scan 2B of Table 1 as an example, register 52B would contain a count of 19. The outputs of memory 60 would then be 8, 12, 16, 24, 32 and 48. The value in register 52A is compared against the value of register 52B in this case a first bar (1B) is compared against a first space (1S). The eighteen count value of resister 52A falls, therefore, between a pair of values from memory 60, namely, 16 and 24. In response, the states of comparators 62 would indicate this bracketing to pattern means 64. It will be noted that a bar is compared to a space only in the initial phase when insufficient data is available to compare like intervals. comparing like intervals is more desirable since in practical embodiments of printed bar codes, the width of bars will tend to be equal as will the width of spaces. But bars and spaces will not necessarily have the same width.

TABLE I

| SCAN TYPE | SIZE | LATCHES A | B | C | CODE PATTERN REGISTER | COM-PARE | DATA |
|---|---|---|---|---|---|---|---|
| 1B | 19 | | | | MSB LSB | | |
| 1S | 18 | 19 | | | 0 | | |
| 2B | 22 | 18 | 19 | | 00 | 1B - 1S | |
| 2S | 18 | 22 | 18 | 19 | 000 | 1B - 2B | |
| 3B | 21 | 18 | 22 | 18 | 0000 | 1S - 2S | |
| 3S | 17 | 21 | 18 | 22 | 00000 | 2B - 3B | |
| 4B | 42 | 17 | 21 | 18 | 000000 | 2S - 3S | |
| 4S | 19 | 42 | 17 | 21 | 0000001 | 3B - 4B | |
| 5B | 21 | 19 | 42 | 17 | 00000010 | 3S - 4S | 02 |
| 5S | 40 | 21 | 19 | 42 | 00000100 | 4B - 5B | |
| 6B | 41 | 40 | 21 | 19 | 00001001 | 4S - 5S | |
| 6S | 18 | 41 | 40 | 21 | 00010011 | 5B - 6B | |
| 7B | 22 | 18 | 41 | 40 | 00100110 | 5S - 6S | |
| 7S | 38 | 22 | 18 | 41 | 01001100 | 6B - 7B | |
| 8B | 42 | 38 | 22 | 18 | 10011001 | 6S - 7S | |
| | | 42 | 38 | 22 | 00110011 | 7B - 8B | 33 |
| | | | 42 | 38 | | | |
| | | | | 42 | | | |

The pattern means 64 determines what binary values should be loaded into the code pattern register 66 in response to the six outputs of the comparator 62. Regardless of the width of the first interval, a zero is initially written into register 66, designating the first bar as a zero. The first interval would be subsequently defined as a one by pattern means 64 if the following space was half the value.

After the next bar is received, the data is shifted in registers 52A, B, C, in response to the transition signal on terminal DEC1. Thereafter, the value of register 52C can be compared with the value of register 52A. This process enables bars to be compared with bars and spaces with spaces.

After each comparison, the pattern means 64 determines from the previous state what to load into register 66 (either a zero or a one). A zero represents a narrow bar or space and a one indicates a wide bar or space. When eight bits of information are shifted into register 66 (creating a byte), the information is written into the dual port RAM memory 48 by the state means 70. In the example of Table 1, the first byte written is 02 (hex). The second byte is 33 (hex).

Figure 6:
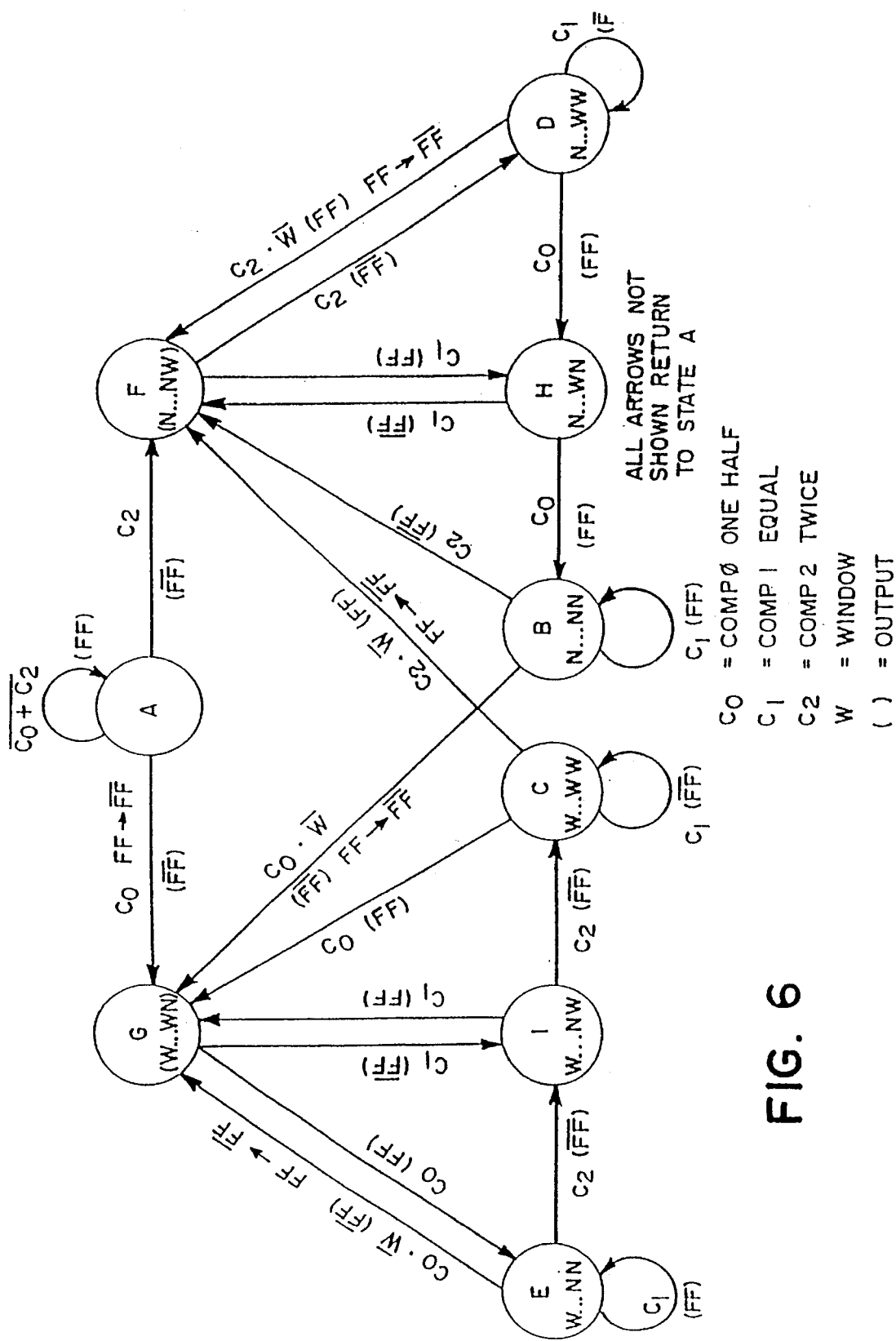
FIG. 6 is a state diagram associated with the pattern detecting circuitry of FIG. 3.

FIG. 6 illustrates the pattern detecting algorithm of the pattern means 64. The machine is a synchronous state machine. A bar or space is compared to an adjacent or alternative bar or space. If the ratio is either equal, half or twice (within tolerances), then a valid pattern is found. A pattern is invalid if none of the above comparisons are true (nothing is stored for invalid patterns). If the number of consecutive valid ratios exceeds five (up to eight) the numerical representation of these patterns, that is a binary string of ones and zeros, is saved in memory.

Because of the nature of the algorithm, the pattern detecting means 64 is highly fault tolerant. A variable error margin set by memory 60, is incorporated with the digital comparator circuit 62 to allow more flexible comparison of the width of bars and spaces. Because of this comparison, it is possible for a bar to vary form another bar by a large percentage and still be recognized as part of a valid pattern. In most cases, a bar is compared only with a bar and a space only with another space. This is important because most bar code label printing is breached, causing the width of the bar to vary considerably with the width of the space.

As shown in FIG. 6, the pattern means 64 (FIG. 3) has a total of nine unique states, labelled A-I. Pattern means 64 operates on an asymmetric clock identified as terminal XTNDEC (FIG. 3), a pulse generated on each transition between intervals and extended for five clock cycles. The operation of the pattern means 64 can be divided into two halves because only one half of the machine is active at any instant, either the left or right half. FIG. 6 clearly shows the two haves being symmetrical. The left half consists of states C, E, G and I while the right half contains states B, F, D and H. The right half of the pattern means 64 is used if the first bar scanned is determined to be narrow. Otherwise, the left half is active.

The function of each state is described below:

State A: Power-on State. Also occurs if comparison is equal in this state or if any undefined comparison occurs.

State F: Comparison is twice in state A, state B, or comparison is equal in state H. Also, comparison is twice AND WINDOW is low (i.e.: no string of more than four transitions is found, no data stored) in state D or state C.

State D: Comparison is twice in state F or comparison is equal in this state.

State H: Comparison is equal in state F or comparison is half in state D.

State B: Comparison is half in state H or comparison is equal in this state.

Stage G: Comparison is half in state A, state C, or comparison is equal in state I. Also, comparison is half AND WINDOW is low (i.e.: no string of more than four transmissions is found, no data stored) in state E or state B.

State E: Comparison is half in state G or comparison is equal in this state.

State I: Comparison is equal in state G or comparison is half in state E.

State C: Comparison is twice in state I or comparison is equal in this state.

ZOUT: The signal ZOUT is the output signal from the state machine. A "one" will be shifted into the shift register for a wide interval, and a "zero" will be shifted in for a narrow interval. (A "one" means a wide interval.)

In addition to the functions described above, the LCA of pattern means 64 also contains several timing signals to load counters and store data.

TABLE 2

| SCAN | DATA |  |  |  | STRING LENGTH | NARROW VALUE | LABEL POSITION | BAD SCAN |
|------|------|----|----|----|---------------|--------------|----------------|----------|
| 1 | (NO DATA) |  |  |  |  |  |  |  |
| 2 | 02 | 04 |  |  | 09 | 99 | ø50 | 0 |
| 3 | 02 | 33 |  |  | 15 | 99 | ø50 | 0 |
| 4 | 02 | 66 | A5 |  | 22 | 20 | ø50 | 0 |
| 5 | 13 | 34 | A7 | 9C | 26 | 99 | ø50 | 0 |
| 6 | 9A | 53 | 81 | 06 | 26 | 20 | ø50 | 0 |
| 7 | 94 | E0 | 0C |  | 21 | 99 | ø45 | 0 |
| 8 | 70 | 0C |  |  | 14 | 99 | ø40 | 0 |
| 9 | 0C |  |  |  | 07 | 99 | ø35 | 0 |

State machine 70 (FIG. 3) writes latched data bytes from various registers into dual port RAM memory 48. This memory is accessed at the same time by microprocessor board 42 which permits high speed operation. While the state machine 70 stores the current data from the present scan in port ADR, DATA, the stored data from the previous scan is read by the microprocessor board 42 at the other port DA, AD.

Referring to Table 2, on each scan, one or more bytes of data indicating bar and space widths can be obtained. After the scanned width data are written onto bus DATA, the data in the latches and counters connected to bus DATA sequentially write the indicated string length, narrow value, label position, and the number of bad scans. For example, the third scan produces two data bytes indicating the code pattern of narrow and wide bars and spaces. The string length, however, is only fifteen bits long, indicating that the last byte has only seven valid data bits. For this scan, the narrow value stored by counter 81 is 99 which compares properly with the narrow value of the prior scan, scan number two. Similarly, the label position from counter 76 is 50 which compares properly with the prior label position value.

In this embodiment, the data bytes indicating the interval widths are stored between location XF00 and XF1F in the dual port RAM 48. The maximum that can be saved thirty-two bytes (i.e. 256 transitions). The following block in memory is the string qualifier data. This block includes the narrow value, string length, label position and number of bad scans. The string qualifier data is stored between memory locations XF20 and XFC1.

The output from counters 74–81 are "tristated" so that only one uses the bus DATA at one time. Referring to the flow chart of FIG. 7A, it shows the sequence of operations of state machine 70. When initialized, state means 70 starts at step S1 (FIG. 7A). Loop I starts with a branching decision.

If a transition occurs (signal DEC) and the scan is not over, branches S1 and S2 transfer control to steps S3 and S4 so that a byte of values indicating a bit pattern of bars and spaces is loaded into memory 48. The string data counter 82 which points to the appropriate address is incremented.

If at the next transition all scanning is completed, then loop II is executed. In loop II, the state machine 70 successively stores bytes of interval pattern data and then increments the address pointer. Steps S5 and S6 are essentially the same as previously described steps S3 and S4. In the following steps S7 and S8, the string length of counter 80 is written into memory 48 along data bus DATA. String qualifier byte counter 84 is incremented. Next, in steps S9 and S10, narrow value latch 81 is loaded into memory 48 along data bus DATA. The string qualifier byte counter 84 is incremented to indicate the next position. In steps S11 and S12, the value in label position counter 76 is loaded along bus DATA into memory 48 and counter 84 is incremented. In steps S13 and S14, the bad scans counter 74 is loaded into memory 48 along bus DATA and counter 84 is again incremented.

If the scan has ended, loop III is executed so that the scan number stored in counter 78 is loaded into memory 48 along bus DATA to the address indicated by counter 84 which is then incremented.

The actual control signals for registers and memory interface are implemented in the state means 70. The function of various timing events are described below:

WINDOW: Indicates a save of the current string. This occurs if the minimum string length of five is exceeded. This signal resets at the end of the string.

SAVSD (L5): Indicates a byte of string data was saved. This occurs when the eight-bits shift register is full or when the string is ended.

SAVALL (L3): Indicates all data was saved (i.e.: string data, string length, narrow value, label position, and the number of bad scans). This signal is active if the string is ended.

SLEQCR (L1): Determines whether the String Length Counter 80 is loaded with a "1" or the number of consecutive equal WIDE/NARROWS. It chooses a "1" if the string is ended or no string is being saved. It chooses later if the comparison to a wide is twice or comparison to a narrow is half AND the current string is not being saved.

LDSLC/(L2): Synchronous load of String Length Counter (SLC). Occurs if the current string is being saved or if the comparison is JUNK.

LDEQ/(L4): Synchronously loads a "1" into the Consecutive Equal Counter (CEC). Occurs if the comparison is not equal.

JUNK: Occurs if the comparison is not half, equal or twice. It also occurs if the bar/space width exceeds the present limits.

SELREG2 (Mux_sel): Selects register 52B or register 52C for an adjacent or alternate comparison, respectively. It chooses the adjacent comparison if in state A and comparison is JUNK. It chooses later if comparison is not JUNK.

Because the state machine 70 is arranged as just described, each state either proceeds to the next state or does not change. Also the next state is always a new state and never a previous state. This ensures that within one iteration, no state can be active more than one time.

Figure 7B:
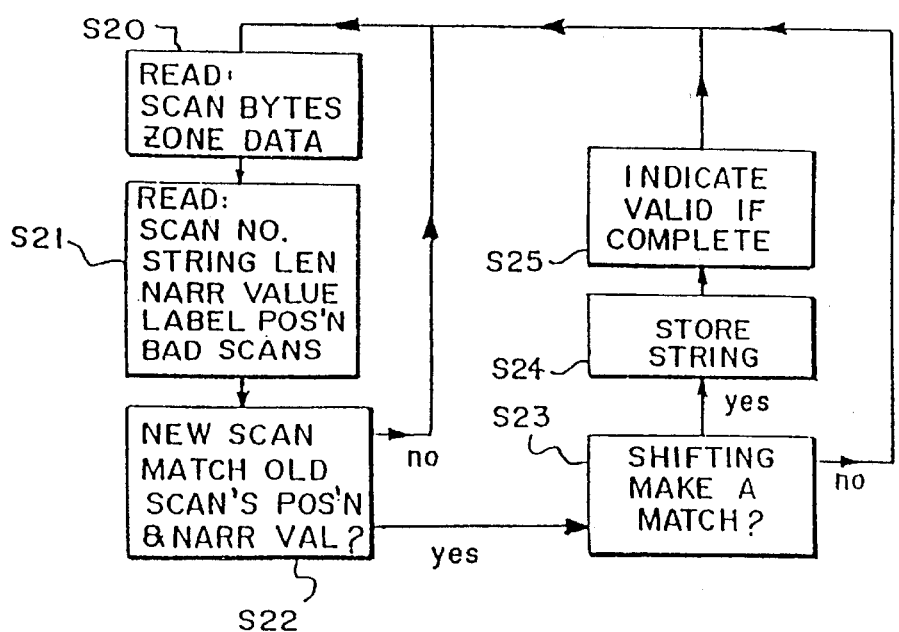
FIG. 7B is a flow chart schematically illustrating the sequence of operations of the microprocessor of FIG. 3.
Figure 8:
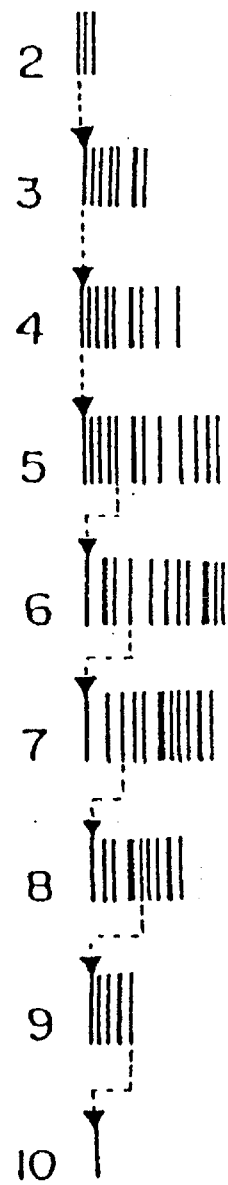
FIG. 8 illustrates the matching of the bar code fragments detected by the scanner.
Figure 9:
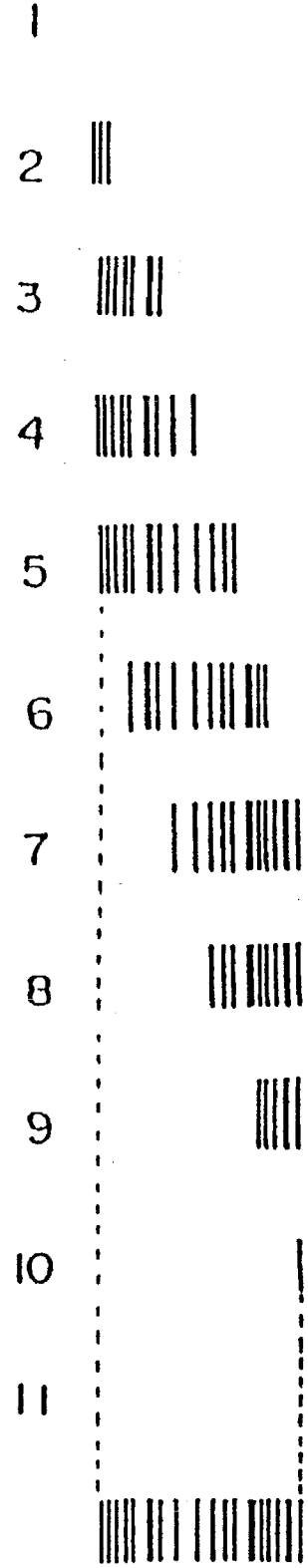
FIG. 9 illustrates the shifting of the bar code fragments of FIG. 8 to a position where the common intervals are overlaid.

Referring to FIG. 7B, it shows the operation associated with the microprocessor board 42 of FIG. 3, when scan data is available. The flow chart in FIG. 7B is executed starting at S20, to read the scanned data bytes. Next in step S21, the string qualifier data is read: the scan count number, the string length, the narrow value, the label position and the number of bad scans. Next in step S22, the microprocessor determines whether the latest scan is equivalent to the earlier scans in label position value and narrow width value. If it is not, control returns to step S20; otherwise, control is given to step S23. In step S23, the microprocessor shifts the latest bit pattern with respect to prior bit patterns to see whether there is a matching subinterval. If these is, control is shifted to step S24; otherwise control reverts to step S20. Steps S24 and S25 are executed to store the reconstructed string. If the reconstructed string is sufficiently long, the microcomputer indicates that a complete and valid code has been assembled. FIGS. 8 and 9 graphically illustrated this process. As shown in FIG. 9, the data fragment by the scanner are matched. Referring to FIG. 9, the fragments are shifted to a position where the common sub-intervals are overlaid. This valid code once assembled, can be used in a conventional manner.

It will be appreciated that various modifications and alterations can be made to the apparatus just described. For example, the sequence in which various steps are performed can be altered. Furthermore, the digital circuitry can be composed of arrays as shown or may in some embodiments employ another independent microprocessor or digital signal processor. While three "X" patterns are illustrated, a different number can be used. The arrangement and use of mirrors can be altered depending upon the desired mode of slewing the laser beam. While the comparison between data strings is conditioned on having corresponding label positions and narrow values, in other embodiments different comparisons or no comparisons may be employed. The tolerance placed on the ratios of current to former interval widths can be varied depending upon the expected accuracy of the printed codes. While optically-readable printed labels are described, it will be understood that other media such as magnetic media may be employed instead. The illustrated digital circuits can be composed of larger or smaller scale integrated circuits without departing from the scope of the present invention. Also the speed and the dimension of the scan can be altered depending upon the particular application.

It will be appreciated that various other modifications can be implemented to the above described embodiment and that the foregoing shall be considered illustrative and that various modifications thereto will not depart from the scope and spirit of the present invention.

We claim:

1. A scanner for reading machine-readable code on an object, comprising:

scanning means for repetitively scanning the code and providing a plurality of scan signals, each including a code fragment and an associated code position value that corresponds to one of the successive scans of the code;

data means for receiving and storing the scan signals; and reconstruction means coupled to the data means for reconstructing at least a portion of the code from two or more code fragments by determining whether the code position value from a later scan signal corresponds to the code position value from an earlier scan signal, identifying a subinterval in the later and earlier code fragments, overlaying the code fragments and verifying that the subintervals are in registration.

2. A scanner according to claim 1 wherein the reconstruction means includes means to shift the code fragments relative to each other when the subintervals are not initially verified in registration.

3. A scanner according to claim 2 wherein the reconstruction means disregards the later code fragment when the subintervals are not verified in registration after shifting the code fragments.

4. A scanner according to claim 1 wherein the reconstruction means disregards the later code fragment when the subintervals are not verified in registration.

5. A scanner for reading machine readable code on an object comprising:

scanning means for repetitively scanning the code and providing code fragments with associated code position values;

data means for receiving and storing the code fragments and the associated code position values; and reconstruction means coupled to the data means for reconstructing at least a portion of the code from two or more code fragments by identifying a subinterval in a later and an earlier code fragment and, utilizing the code position values for the respective code fragments, overlaying the code fragments with the subintervals in registration.

6. A scanner according to claim 5 wherein the reconstruction means combines the registered fragments into a data string representing a reconstructed portion of the code.

7. A scanner according to claim 5 wherein the reconstruction means shifts the code fragments relative to each other when the subintervals are not initially verified.

8. A scanner according to claim 5 wherein the reconstruction means disregards the later code fragment when the subintervals are not verified in registration after shifting the code fragments.

* * * * *

UNITED STATES PATENT AND TRADEMARK OFFICE
CERTIFICATE OF CORRECTION

PATENT NO. : 5,548,107
DATED : August 20, 1996
INVENTOR(S) : Lapinski et al.

It is certified that error appears in the above-identified patent and that said Letters Patent is hereby corrected as shown below:

At column 3, line 57, delete "bean" and insert therefor --beam--.

At column 4, line 24, delete "produces" and insert therefor --produce--.

At column 4, line 40, delete "form" and insert therefor --from--.

At column 5, line 16, delete "form" and insert therefor --from--.

At column 5, line 24, delete "elaborated" and insert therefor --elaborately--.

At column 8, line 37, delete "comparing" and insert therefor --Comparing--.

At column 9, line 32, delete "form" and insert therefor --from--.

At column 9, line 46, delete "haves" and insert therefor --halves--.

At column 12, line 10, delete "these" and insert therefor --there--.

At column 12, line 15, delete "illustrated" and insert therefor --illustrate--.

UNITED STATES PATENT AND TRADEMARK OFFICE
CERTIFICATE OF CORRECTION

PATENT NO. : 5,548,107
DATED : August 20, 1996
INVENTOR(S) : Lapinski, et. al.

It is certified that error appears in the above-indentified patent and that said Letters Patent is hereby corrected as shown below:

At column 12, line 16, delete "fragment" and insert therefor --fragments--

Signed and Sealed this

Twenty-sixth Day of November 1996

Attest:

BRUCE LEHMAN

Attesting Officer

Commissioner of Patents and Trademarks